United States Patent [19]

McCoy

[11] Patent Number: 4,776,871
[45] Date of Patent: Oct. 11, 1988

[54] SHEAR BLADE LOCKOUT IN AN INDIVIDUAL SECTION GLASS MACHINE

[75] Inventor: Wilbur L. McCoy, Toledo, Ohio

[73] Assignee: Owens-Illinois Glass Container Inc., Toledo, Ohio

[21] Appl. No.: 41,569

[22] Filed: Apr. 23, 1987

[51] Int. Cl.[4] ................................................ C03B 7/10
[52] U.S. Cl. .......................................... 65/158; 65/29; 65/160; 65/163
[58] Field of Search .................... 65/29, 158, 160, 163, 65/164

[56] References Cited

U.S. PATENT DOCUMENTS

| | | | |
|---|---|---|---|
| 3,957,477 | 5/1976 | Jones | 65/160 |
| 4,247,317 | 1/1981 | Wood | 65/29 |
| 4,266,461 | 5/1981 | Wood | 65/29 |
| 4,375,669 | 3/1983 | Johnson | 65/160 |
| 4,467,431 | 8/1984 | Gardner | 65/29 |
| 4,615,719 | 10/1986 | Pauluk | 65/29 |
| 4,708,727 | 11/1987 | Franco et al. | 65/160 |

Primary Examiner—Kenneth M. Schor

[57] ABSTRACT

An electronics package for automatically inhibiting operation of the shear blades of an individual section glass machine is responsive to periodic signals from an encoder disc indicative of timing increments in a machine cycle and to motion detectors adjacent to the shear blades for detecting shear operation at the desired point in the machine cycle and for inhibiting shear activation in the absence of such operation. The lockout electronics package includes a programmable counter responsive to the cycle-increment signal for generating a first shear-inhibit signal in the absence of shear operation within the programmed number of cycle increments, and a watchdog timer responsive to the cycle-increment signal for generating a second shear-inhibit signal in the absence of a cycle increment signal above a preselected frequency. A solid state relay is responsive to either of the shear-inhibit signals for removing electrical power from the shear operating mechanism. The electronics package is responsive to an operator shear-unlock switch for reenergizing the shear activating mechanism independently of the counter and timer.

9 Claims, 3 Drawing Sheets

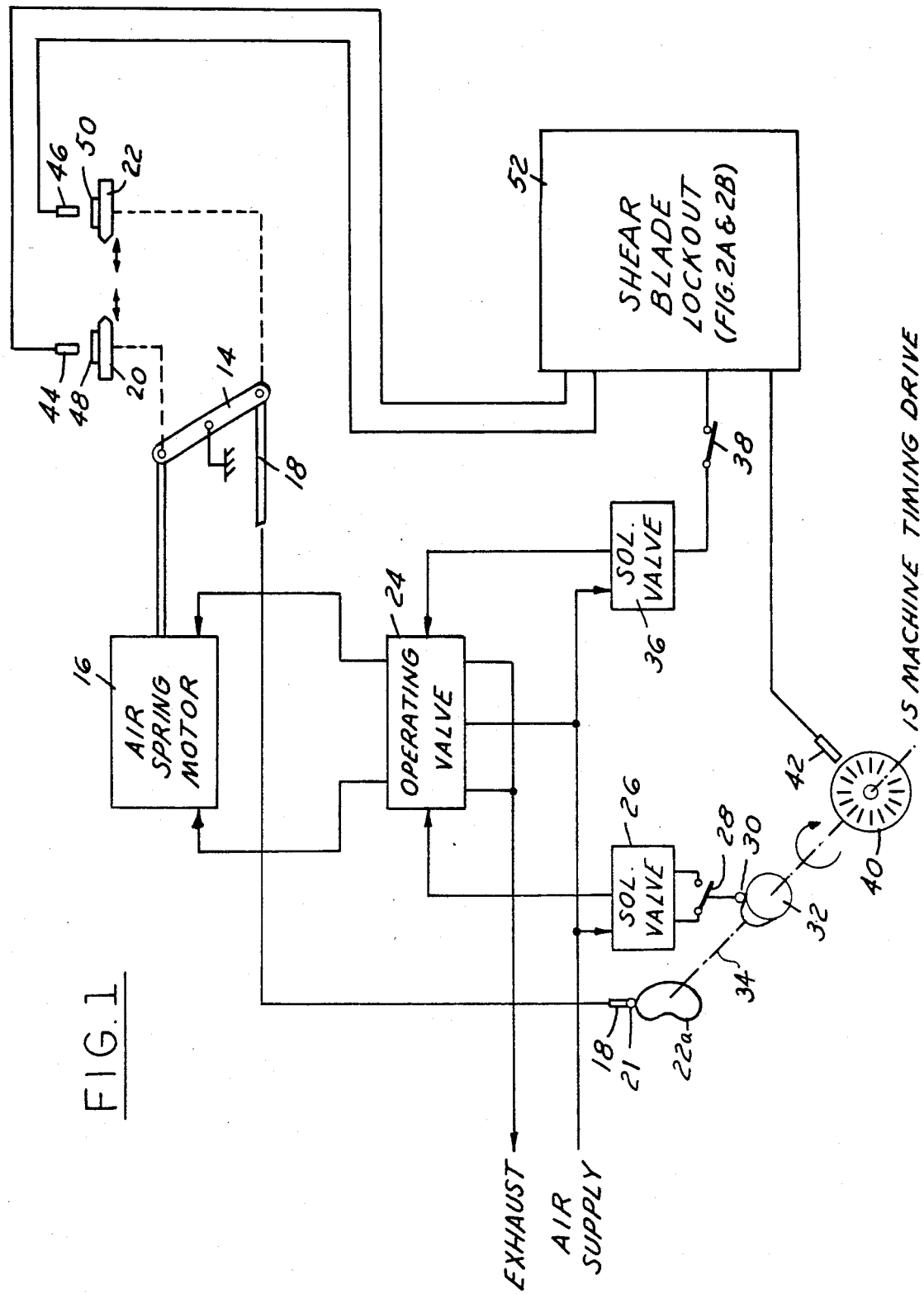

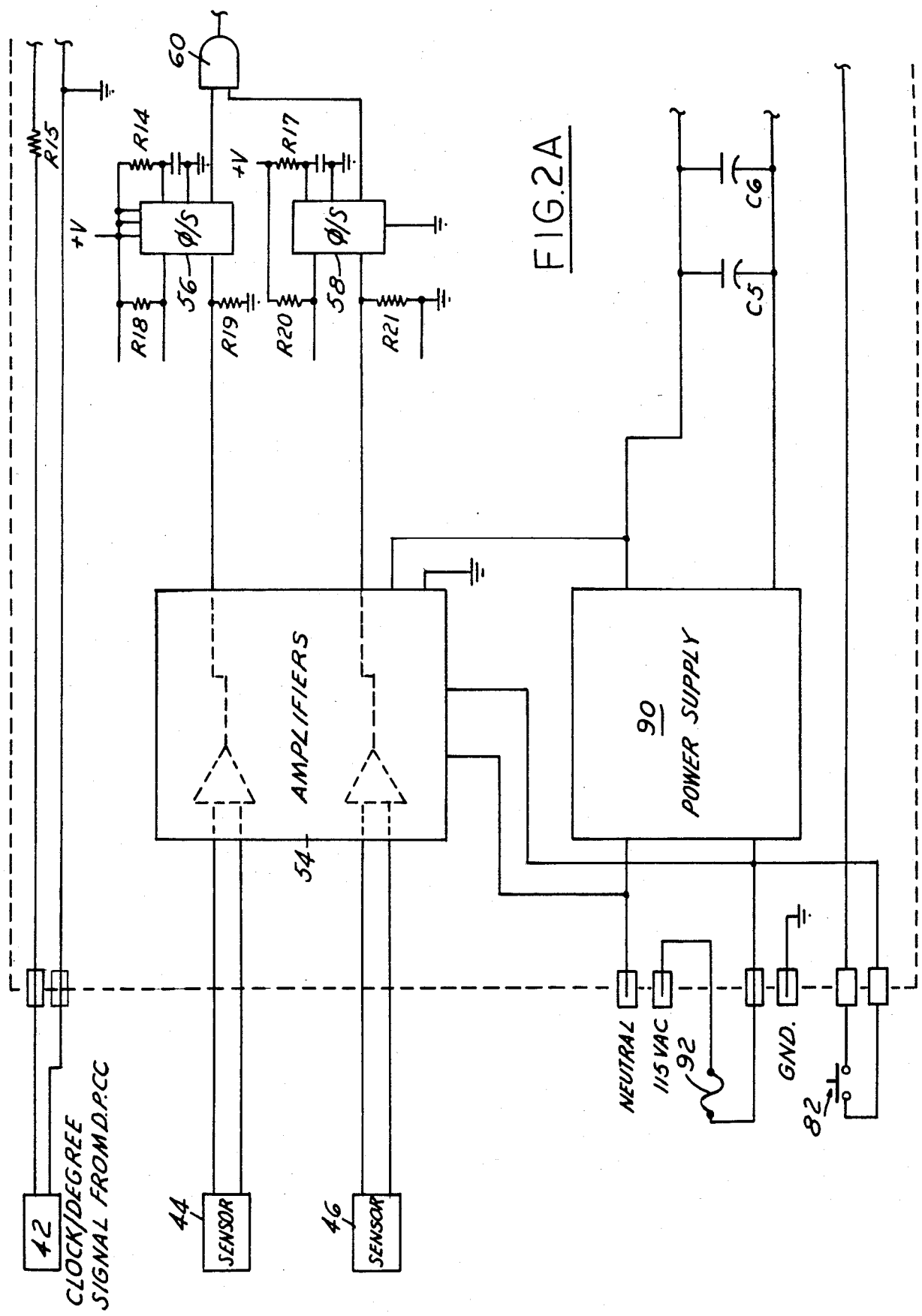

SHEAR BLADE LOCKOUT IN AN INDIVIDUAL SECTION GLASS MACHINE

The present invention is directed to so-called individual section or IS machines for forming glass containers and the like, and more particularly to electronic apparatus for preventing damage to the glass gob shears in the event of machine malfunction or failure.

BACKGROUND AND OBJECTS OF THE INVENTION

Individual sections or IS machines have been well known and employed for a number of years in formation of glass containers such as bottles and jars. In general, such machines comprise a plurality of individually operated sections, each of which includes one or more glass-forming molds and air-operated devices for operating the molds and the associated glass feed mechanisms. Molten glass is cut by air-operated shears into individual gobs of preselected size, which are fed by chutes to the individual machine sections. All of the machine operating mechanisms are driven in coordination by a timing camshaft or the like. The glass gob shears are very expensive. Shears having magnesium arms and platinum blades may cost $14,000.00 per pair. It is therefore highly desirable to prevent damage to the shear blades, which may occur if the shears remain closed because of machine failure and molten glass is then directed thereon. It is therefore a general object of the present invention to provide electronic apparatus for sensing machine malfunction or failure, and for automatically inhibiting or locking operation of the shears so as to prevent damage thereto.

SUMMARY OF THE INVENTION

In accordance with a preferred embodiment of the present invention herein disclosed, an encoder disc or the like is coupled to the IS machine drive for providing a periodic signal indicative of time-increments of a machine cycle. Motion detectors are positioned adjacent to the paths of travel of the shear blades for providing corresponding signals indicative of shear blade operation. Electronics compare the operation-indicative signals from the blade motion detectors to machine cycle timing and generate a first signal in the event that the shear blades do not operate at the appropriate point in the machine cycle. Such failure of shear operation is interpreted as a machine failure, and further shear operation is inhibited.

The timing comparison is preferably performed using a counter responsive to the timing increment signals for tracking cycles of machine operation. Switches provide selective programmability at the counter for indicating the number of timing increments in which shear operation should occur. The shear motion detectors preferably comprise a pair of electromagnetic proximity detectors operatively coupled to ferromagnetic sections mounted on the shear blades. The proximity detector signals are directed through parallel oneshots and through a gate for detecting coincidence of the shear-motion signals to reset the counter. Failure of such coincidence within the programmed counter time indicates a machine failure and energizes a solid state relay to remove electrical power from the shear operating mechanism. A watchdog timer is responsive to the periodic cycle-timing signals and provides a second signal to inhibit shear operation in the absence of such timing signals from the IS machine drive. Operator switches provide for shear operation independently of the monitoring electronics to initiate or test machine operation.

BRIEF DESCRIPTION OF THE DRAWINGS

The invention, together with additional objects, features and advantages thereof, will be best understood from the following description, the appended claims and the accompanying drawings in which:

FIG. 1 is a fragmentary block diagram of an IS machine illustrating operation of the gob shear mechanism and of a shear blade lockout coupled thereto in accordance with the present invention; and FIGS. 2A and 2B together comprise an electrical schematic diagram of the shear blade lockout mechanism illustrated in block form in FIG. 1.

DETAILED DESCRIPTION OF PREFERRED EMBODIMENT

Figure 2B:
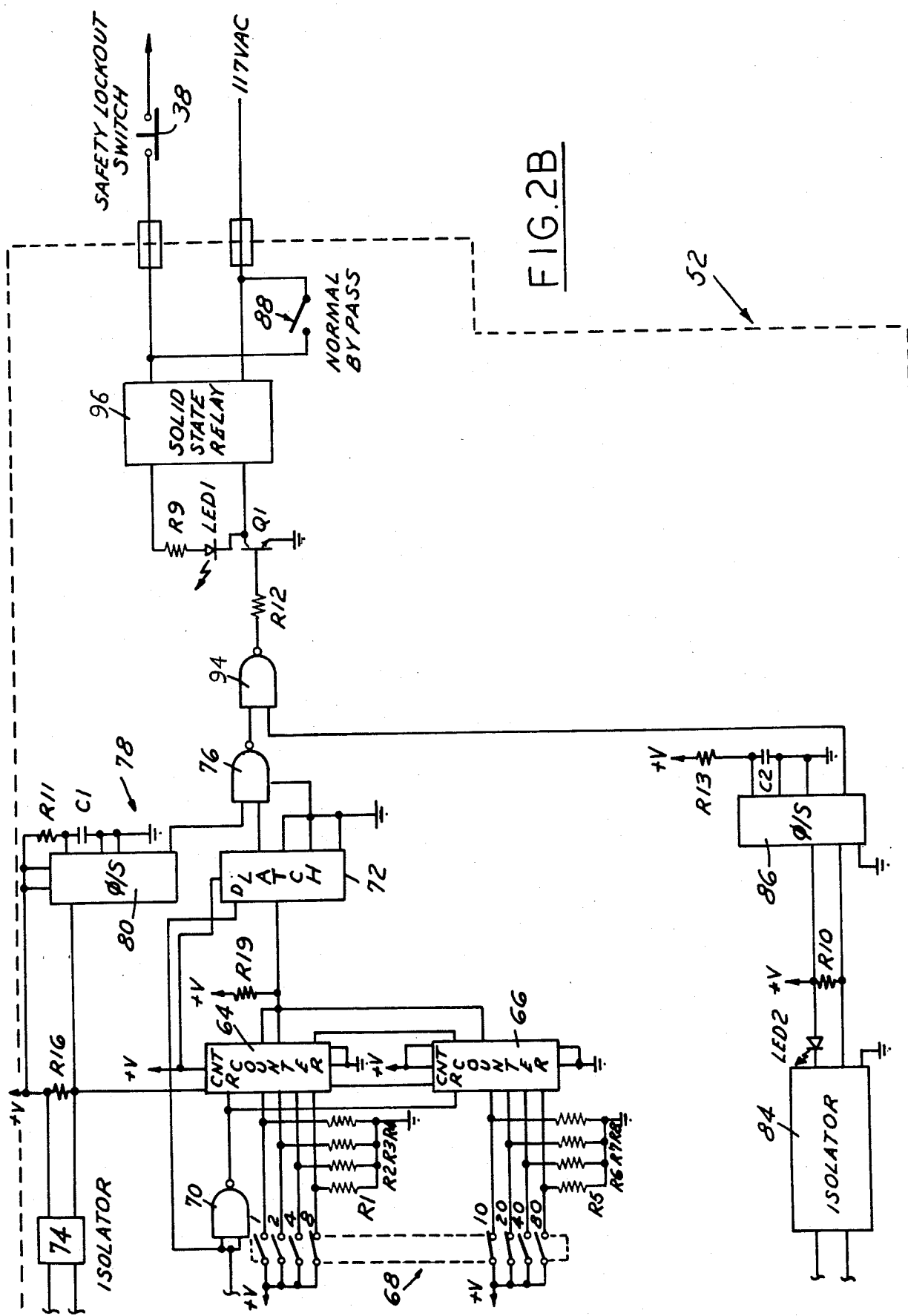

FIG. 1 illustrates a pair of shear blades 20, 22 coupled to a lever 14 and carried by rods or the like (not shown) for parallel motion toward and away from each other under control of lever 14. One end of lever 14 is coupled to an air spring motor 16 which is driven by an operating valve 24. The other end of lever 14 is coupled by a rod 18 to a following roller 21 which rides on a cam 22. Cam 22 is coupled to an IS machine timing drive shaft 34.

Operating valve 24 is connected to and controlled during normal operation by a solenoid valve 26. An electrical switch 28 is coupled to a follower 30 for selectively energizing solenoid valve 26 as a function of rotation of the cam 32. Cam 32, along with a multiplicity of additional cams, is carried by or coupled to the IS machine master drive shaft 34 which coordinates operation of sections of the IS machine. A second solenoid valve 36 is coupled to operating valve 24 for inhibiting operation thereof. Solenoid valve 36 is connected to a normally closed electrical safety switch 38 which may be selectively opened by an operator for maintenance or repair to the shear blades. In summary, shear blades 20, 22 are normally biased to the closed or engaged position by valve 34 and spring motor 16, and are opened periodically during the machine cycle by cam 22a and rod 18 to permit passage of glass therebetween. In the event of malfunction, air pressure to spring motor 16 is controlled by valves 24, 36 to bias the shears open independently of cam 21 and rod 18. To the extent thus far described, the IS machine fragmentarily illustrated in FIG. 1 is of conventional construction.

In accordance with a preferred embodiment of the present invention illustrated in the drawings, an encoder disc or the like 40 is operatively coupled to IS machine drive shaft 34 and has an associated sensor 42 for providing periodic signals indicative of rotation of shaft 34, and therefore indicative of increments of time in a machine operating cycle. A pair of electromagnetic proximity detectors or sensor 44, 46 are positioned adjacent to the paths of travel of respective shear blades 20, 22 and are responsive to passage of ferromagnetic metal sections 48, 50 carried by the shear blades for sensing motion of the shear blades therepast. Sensors 42, 44, 46 are connected to shear blade lockout electronics 52, which are illustrated in greater detail in FIGS. 2A-2B.

Lockout electronics 52 includes an amplifier module 54 (FIG. 2A) purchased to match the proximity sensors 44, 46 employed. Amplifiers 54 receive the motion signals from sensors 44, 46 and provide corresponding outputs to a pair of oneshots 56, 58. The function of oneshots 56, 58 is to lengthen the amplified sensor signals and provide corresponding outputs to a coincidence-detection gate 60. A pair of presetable cascaded counters 64, 66 have data inputs individually connected through corresponding switches 68 to the supply voltage and through resistors R1-R8 to ground. Switches 68, when closed, thus individually represent valves of "1", "2", "4", "8", "10", "20", "40" and "80" as preset inputs to counters 64, 66. In the application illustrated in FIG. 2B, the "8", "10" and "20" switches are closed, so as to preset counter 64, 66 to a count of "38". The reset inputs of counters 64, 66 are connected through a gate 70 to the output of gate 60 (FIG. 2A). The output of counters 64, 66, which indicates that the counters have reached the value of the inputs preset at switches 68, is fed to a latch 72. The reset input of latch 72 is connected to the output of gate 60 (FIG. 2A).

Encoder sensor 42 is connected through an optical isolator 74 (FIG. 2B) to the count input of counter 64. The count input of counter 66 is connected to the carry output of counter 64. Counters 64, 66 thus count in synchronism with the periodic signal from encoder sensor 42 up to the level corresponding to preset input switches 68, and provide an output to latch 72 in the absence of an intervening counter and latch reset signal from gate 60. Such counter reset signal is generated upon detection of motion at blade sensors 44, 46, provided that such motion signals coincide (overlap) in time at gate 60. In the absence of motion signals at both detectors within the machine cycle time set by switches 68, or in the absence of motion signal coincidence, latch 72 is set by contour 64 to provide a first signal to the gate 76. In the particular application illustrated by way of example in the drawings, it is assumed that the IS machine is a ten-station machine, and that encoder 40 provides one count signal at sensor 42 for each degree of rotation at shaft 34. Thus, shear blades 20, 22 should close once per each thirty-six degrees of shaft rotation. Counters 64, 66 are preset to "38" to provide some overlap tolerance.

A watchdog timer 78, comprising a retriggerable oneshot 80, monitors the frequency of the periodic signal output from encoder sensor 42. Timer 78 provides a second input to gate 76 in the event that such encoder signal frequency falls below the oneshot pulse direction set by resistor R11 and capacitor C1. Gate 76 is connected through a gate 94 and through a transistor Q1 to a solid state relay 96. Relay 96 is responsive to a signal at either input of gate 76 for removing utility power from solenoid valve 36 (FIG. 1) and thereby inhibiting operation of operating valve 24. It will thus be appreciated that the shear blade lockout electronics is designed to be failsafe in operation. In the event of malfunction or failure at the IS machine, manifested by failure of shears 20, 22 to move in coincidence, failure to move at the appropriate times or failure of shaft 34 to rotate at desired frequency, solid state relay 96 and solenoid valve 36 are deenergized and operating valve 24 is locked. Of course, in the event of an electrical power failure, relay 96 and valve 36 are automatically deenergized.

To unlock the shear lockout mechanism and to reinitiate shear operation, an operator switch 82 (FIG. 2A) is connected through an optical isolator 84 to a oneshot 86. The output of oneshot 86, having a pulse duration determined by resistor R13 and capacitor C2, is connected through gate 94 and resistor R12 to transistor Q1 to energize the transistor, and thereby energize relay 96 and feed power to solenoid valve 36, independently of gate 76, counters 64, 66 and timer 78. An operator switch 88 is connected in parallel with the output of relay 80 to feed electrical power to solenoid valve 36 independently of lockout electronics 52 for purposes of maintenance and repair. Lockout electronics 52 includes and is powered by a power supply 90 (FIG. 2A) which receives utility power through a fuse 92.

The invention claimed is:

1. In an individual section (IS) glass machine which includes a pair of shears each mounted for reciprocation to shear glass gobs for individual sections of the IS machine, means coupled to said IS machine for establishing a machine operating cycle and means for selectively and repetitively actuating said shears in a plurality of shear cycles at preselected points in said machine cycle, electronic means for monitoring operation of said shears and automatically preventing operation thereof in the event of machine malfunction, said electronic means comprising means coupled to said cycle establishing means for providing a periodic signal indicative of predetermined timing and advancement fractional increment of said shear cycle, means coupled to said shears for providing a pair of signals indicative of operation at respective ones of said shears, means responsive to said pair of operationindicative signals for providing a first signal when said operation-indicative signals overlap with each other in time, means for comparing said first signal to said fractional increment signal to provide a second signal indicative of failure of said first signal to occur at a said preselected point in said machine cycle, and means coupled to said actuating means and responsive to said second signal for inhibiting operation of said actuating means.

2. The IS machine set forth in claim 1 wherein said comparing means includes counter means having a count input responsive to said periodic timing-indicative signal for counting said fractional increments of said shear cycle and a reset input responsive to said first signal.

3. The IS machine set forth in claim 2 wherein said comparing means further comprises means for selectively programming said counter means to provide said second signal at preselected numbers of said cycle increments in the absence of said first signal at said reset input.

4. The IS machine set forth in claim 3 further comprising watchdog timing means responsive to said periodic timing-indicative signal for providing a third signal in the event of failure thereof, said operationinhibiting means being responsive to either of said second and third signals for inhibiting operation at said actuating means.

5. The IS machine set forth in claim 1 wherein said operation-indicative means comprises a pair of motion detection means respectively responsive to motion at said pair of shears.

6. The IS machine set forth in claim 5 wherein said motion detection means comprises a pair of electromagnetic proximity detectors respectively positioned adjacent to motion paths of said shears, and ferromagnetic means carried by each of said shears for generating signals at said proximity detection means indicative of passage of a corresponding shear adjacent thereto.

7. The IS machine set forth in claim 1 further comprising means coupled to said operation-inhibiting means for selectively enabling operation of said actuating means independently of said second signal.

8. The IS machine set forth in claim 7 wherein said selectively-enabling means comprises operator switch means and means responsive to operation of said switch means for enabling operation of said actuating means for only a preselected time duration.

9. The IS machine set forth in claim 7 wherein said operation-inhibiting means includes relay means for selectively connecting electrical power to said actuating means, and wherein said selectively-enabling means includes operator switch means connected in parallel with said relay means.

* * * * *